(12) United States Patent
Reeves et al.

(10) Patent No.: US 11,614,365 B1
(45) Date of Patent: Mar. 28, 2023

(54) LUMINESCENT COLD SHIELD PANELING FOR INFRARED CAMERA CONTINUOUS NON-UNIFORMITY CORRECTION

(71) Applicant: BAE Systems Information and Electronic Systems Integration, Inc., Nashua, NH (US)

(72) Inventors: Jeremy B. Reeves, Chelmsford, MA (US); Steven R. Jost, Amherst, NH (US); Paul R. Moffitt, Hollis, NH (US); Ian B. Murray, Amherst, NH (US); David J. Shelton, Ocoee, FL (US); Raymond D. Tower, Jr., Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 28 days.

(21) Appl. No.: 17/229,310

(22) Filed: Apr. 13, 2021

(51) Int. Cl.
| | |
|---|---|
| *G01J 5/061* | (2022.01) |
| *H04N 5/33* | (2023.01) |
| *H04N 25/671* | (2023.01) |
| *G01J 5/53* | (2022.01) |
| *G01J 5/80* | (2022.01) |
| *G01J 5/06* | (2022.01) |

(Continued)

(52) U.S. Cl.
CPC ............... *G01J 5/061* (2013.01); *G01J 5/06* (2013.01); *G01J 5/53* (2022.01); *G01J 5/80* (2022.01); *H04N 5/33* (2013.01); *H04N 25/671* (2023.01); *G01J 2005/0077* (2013.01); *G01J 2005/065* (2013.01); *G01J 2005/528* (2013.01)

(58) Field of Classification Search
CPC . H04N 5/33; H04N 5/3651; G01J 2005/0077; G01J 2005/065; G01J 2005/528
See application file for complete search history.

(56) References Cited

U.S. PATENT DOCUMENTS

| | | | |
|---|---|---|---|
| 6,091,069 A | 7/2000 | Ashley et al. | |
| 6,127,679 A | 10/2000 | Ashley et al. | |
| 6,670,596 B2 * | 12/2003 | Tsai | G01J 5/52 |
| | | | 348/E5.081 |

FOREIGN PATENT DOCUMENTS

FR     2817693 A1 *    6/2002  ........... H04N 5/2176

OTHER PUBLICATIONS

Lindle et al. HgCdTe negative luminescence devices for cold shielding and other applications, Journal of Electronic Materials, vol. 35, No. 6, pp. 1391-1398 (Year: 2006).*

(Continued)

*Primary Examiner* — David P Porta
*Assistant Examiner* — Jeremy S Valentiner
(74) *Attorney, Agent, or Firm* — Sand, Sebolt & Wernow LPA; Gary McFaline

(57) ABSTRACT

A luminescent diode surface within the cold shield of an infrared camera to allow for continuous non-uniformity correction with uniform irradiance across an infrared IR detector array. Further provided by the inclusion of a luminescent diode surface within the cold shield paneling is the ability to change the diode bias providing a negative luminescent effect while utilizing reverse bias and an electroluminescent effect while utilizing a forward bias. This may then further allow for multiple set points to provide continuous offset and gain correction and to correct non-linear response effects.

19 Claims, 3 Drawing Sheets

(51) Int. Cl.
*G01J 5/00* (2022.01)
*G01J 5/52* (2022.01)

(56) References Cited

OTHER PUBLICATIONS

Rogalski et al. InAsSb-based infrared photodetectors: thirty years later on, Sensors vol. 20, 7047, 72 pages (Year: 2020).*

* cited by examiner

LUMINESCENT COLD SHIELD PANELING FOR INFRARED CAMERA CONTINUOUS NON-UNIFORMITY CORRECTION

STATEMENT OF GOVERNMENT INTEREST

This invention was made with government support under Contract No. N6600120C4013 awarded by the United States Navy. The government has certain rights in the invention.

TECHNICAL FIELD

The present disclosure relates generally to the field of infrared cameras and infrared focal plane sensors. More particularly, in one example, the present disclosure relates to a system and method for continuous non-uniformity correction (NUC) of infrared camera focal plane arrays. Specifically, in another example, the present disclosure relates to an apparatus and method for continuous NUC of an infrared focal plane array utilizing luminescent cold shield paneling.

BACKGROUND

Infrared (IR) radiation is emitted as infrared light, which falls on the electromagnetic spectrum in a range that is invisible to the human eye. IR radiation, or IR light, is instead felt as heat. IR light waves are longer than those of visible light, extending in the electromagnetic spectrum just beyond the red end thereof, between microwaves and visible light. IR light has frequencies ranging from approximately three gigahertz up to approximately 400 terahertz with wavelengths of approximately 30 centimeters to 740 nanometers, although these values are not definitive.

Nearly everything emits IR radiation provided it has a temperature above approximately five degrees Kelvin (approximately equivalent to −450 degrees Fahrenheit or −260 Celsius). Thus, detecting IR radiation is valuable as it can be used to detect people and object, even in low visible light scenarios. For this reason, IR radiation detection is extensively used in both military and civilian applications. Some examples of military use may include target acquisition, surveillance, night vision, homing, and tracking. Non-military uses may include security and environmental monitoring, safety inspection, temperature sensing, communications, spectroscopy, and weather forecasting.

There are many IR detectors available in use with each type having its own advantages and limitations. Common detectors utilize focal plane arrays that can detect IR radiation in one or more of the accessible atmosphere windows, including short-wave infrared (SWIR), mid-wave infrared (MWIR), and long-wave infrared (LWIR). Detection in each of these windows may be obtained using various concentrations of materials within the arrays.

One common issue with many IR detectors, including IR cameras, is that these detectors tend to have introduced non-uniformity that arises from the power on cycle of the camera and further during operation of the detector. This introduced non-uniformity can cause offsets (variation between pixels) in the data between consecutive frames which then need to be compensated for and/or removed from any resulting image to ensure the highest accuracy of detected IR radiation. Similarly, the image produced by IR cameras can drift over time due to non-uniformity introduced during operation. One example is error caused by temperature fluctuation of the camera components as they are used.

Currently, non-uniformity correction (NUC) updates are typically done by mechanically closing a shutter or by turning a gimbal to present the camera with a uniform source from which a corrections table may be generated. These methods rely upon opto-mechanic components and add size, weight, and cost to the camera and further result in a loss of scene acquisition during each correction table update. Certain types of detectors require more frequent NUC updates than others, thus providing a more loss of scene acquisition during those NUC updates, along with more maintenance requirements as the moving parts wear out faster due to the increased workload.

The implementation of opto-mechanic components such as the physical shutter or gimbal, while highly accurate in determining an accounting for spatial noise, further involves introducing moving parts into an IR system that must be sealed for dirt, debris, and other intrusions such as moisture. As many of these systems are commonly installed on high altitude aircraft, temperature fluctuation is often experienced by the IR camera which can further contribute to a higher maintenance cost and higher probability of failure. In such sensitive systems, even the slightest failure can reduce the reliability and/or accuracy of the NUC update calculations. For example, when using a physical shutter, it is assumed that the shutter is completely closed and sealed providing a one hundred percent uniform surface for the IR camera to view; however, even the smallest gap or inclusion in the shutter may result in readings that are due to an outside factor and not due solely to NUC. Thus, the increased likelihood for mechanical failure and/or possibility of unknown introduced error, in addition to the additional maintenance requirement and increased size, weight, and cost, make opto-mechanical solutions less desirable in non-laboratory settings or in situations where these cameras are expected to have long-term repeated use.

Further, depending on the specific application and/or utilization of the IR detector, the need for NUC updates can limit how often these correction tables may be generated based on the specific mission requirements. For example, if scene acquisition is critical, NUC updates may be performed less frequently as to minimize the loss of the scene. In this situation, the image quality will deteriorate more over time with less NUC updates being performed. Collectively, the result is an accumulation of spatial noise that can decrease detection range and increase false alarm rates. Further, this spatial noise accumulation can reduce performance of an IR camera by up to ten times relative to an ideal camera that does not suffer these issues.

Previous attempts to perform NUC utilizing negative luminescence panels instead of opto-mechanical components relied on external negative luminescence panels and/or negative luminescence devices integrated into a cold shield within an IR camera. These devices have been shown to decrease temporal noise of the IR focal plane array; however, these solutions still suffer from periodic NUC updates that still result in loss of scene acquisition during the generation of correction tables.

SUMMARY

The present disclosure addresses these and other issues by providing a luminescent diode surface within the cold shield of an infrared camera to allow for continuous non-uniformity correction with uniform irradiance across an infrared IR detector array. Further provided by the inclusion of a luminescent diode surface within the cold shield paneling is the ability to change the diode bias providing a negative luminescent effect while utilizing reverse bias and an electro-luminescent effect while utilizing a forward bias. This may then further allow for multiple set points to provide continuous offset and gain correction and to correct non-linear response effects.

In one aspect, an exemplary embodiment of the present disclosure may provide an infrared (IR) detector comprising: a focal plane array (FPA) operable to detect IR light; a shield surrounding the FPA; and a plurality of luminescent diodes integrated into at least a portion of the shield surrounding the FPA; wherein the IR detector is free from any opto-mechanical non-uniformity correction (NUC) devices. This exemplary embodiment or another exemplary embodiment may further provide a cold finger operable to cryogenically reduce an operational temperature of the detector, wherein the shield surrounding the FPA is a cold shield. This exemplary embodiment or another exemplary embodiment may further provide wherein the detector is an IR camera. This exemplary embodiment or another exemplary embodiment may further provide one of a short-wave infrared, a mid-wave infrared, and long-wave infrared camera. This exemplary embodiment or another exemplary embodiment may further provide wherein the plurality of luminescent diodes further comprise: a plurality of luminescent diodes etched into a material layer integrated into the shield to define a luminescent material. This exemplary embodiment or another exemplary embodiment may further provide wherein the material layer forms a continuous strip of material covering the entire shield surrounding the FPA. This exemplary embodiment or another exemplary embodiment may further provide wherein the luminescent material is one of PbSe, an alloy from the $Pb_{1-x}Sn_xSe$ group, an alloy from the $Hg_{1-x}Cd_xTe$ group, and InSb. This exemplary embodiment or another exemplary embodiment may further provide wherein the luminescent material is an nBn configuration based on III-V compound semiconductors instead of a p-n junction. This exemplary embodiment or another exemplary embodiment may further provide wherein the luminescent material is a strained-layer superlattice semiconductor comprising one of a p-n junction and an nBn device. This exemplary embodiment or another exemplary embodiment may further provide wherein the plurality of luminescent diodes further comprise: discrete elements in a networked configuration that are further operable to be biased to at least one of a negative luminescent mode wherein an apparent temperature of the luminescent material is reduced and an electroluminescent mode wherein an apparent temperature of the luminescent material is increased. This exemplary embodiment or another exemplary embodiment may further provide wherein the plurality of luminescent diodes are operable under reverse bias in the negative luminescent mode. This exemplary embodiment or another exemplary embodiment may further provide wherein the plurality of luminescent diodes are operable under forward bias in the electroluminescent mode. This exemplary embodiment or another exemplary embodiment may further provide wherein the plurality of luminescent diodes further comprise: discrete cylindrical elements consisting of a p-n junction of semiconductor material having a bandgap energy ranging from 0.062 to 0.285 eV. This exemplary embodiment or another exemplary embodiment may further provide wherein a bandgap energy of the luminescent material is greater than or equal to a bandgap of the FPA, and is less than or equal to a cut-on energy of the detector.

In another aspect, an exemplary embodiment of the present disclosure may provide a method of performing non-uniformity correction (NUC) updates on an infrared (IR) detector comprising: integrating a plurality of luminescent diodes into a shield surrounding a focal plane array (FPA) of the IR detector; calculating a corrections table based on subtracting scene data between consecutive image frames for which a luminescent effect of the plurality of luminescent diodes is activated for one frame and inactive for a subsequent frame; applying the corrections table with multiple set points to provide corrections to detector offset and detector gain; and applying the NUC update results to an IR image. This exemplary embodiment or another exemplary embodiment may further provide wherein calculating a corrections table further comprises calculating the corrections table using plurality of sets consecutive image frames for which a luminescent effect of the plurality of luminescent diodes is activated for one frame and inactive for a subsequent frame. This exemplary embodiment or another exemplary embodiment may further provide wherein calculating a corrections table further comprises: calculating detector offset and detector gain tables. This exemplary embodiment or another exemplary embodiment may further provide updating detector gain tables with multiple set points as a higher order polynomial fit to correct for non-linear gain. This exemplary embodiment or another exemplary embodiment may further provide operating the plurality of luminescent diodes in a negative luminescent mode wherein an apparent temperature of the plurality of luminescent diodes is reduced. This exemplary embodiment or another exemplary embodiment may further provide operating the plurality of luminescent diodes in an electroluminescent mode wherein an apparent temperature of the plurality of luminescent diodes is increased.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
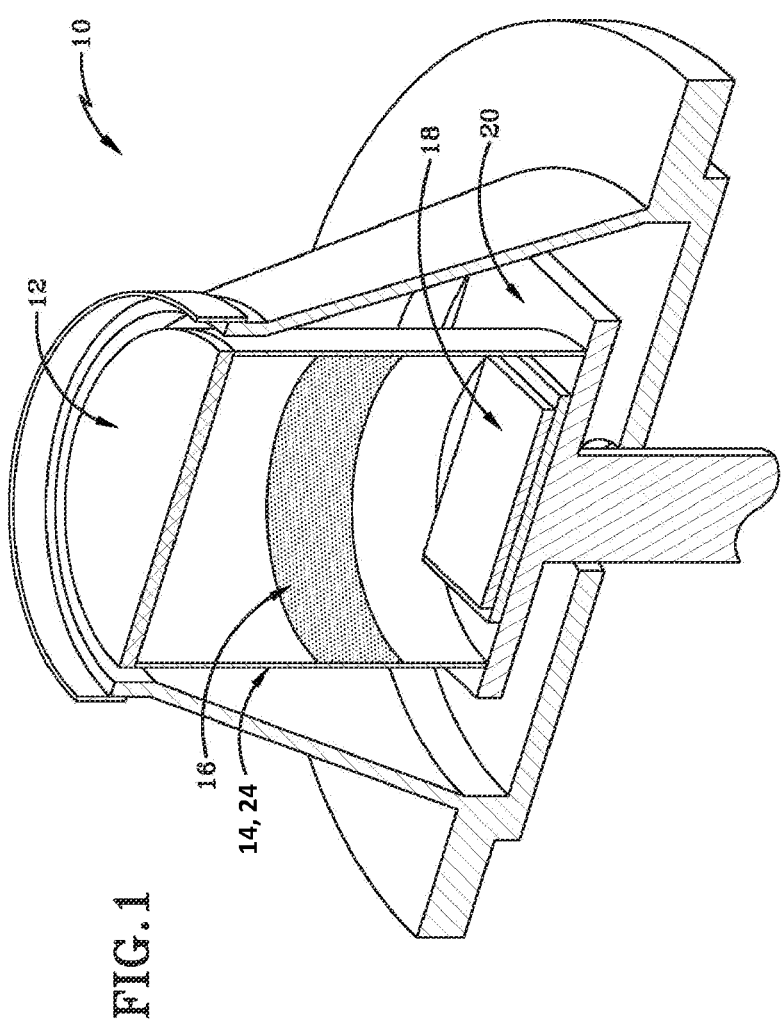
FIG. 1 is a side elevation cross sectional view of an infrared camera according to one aspect of the present disclosure.
Figure 2:
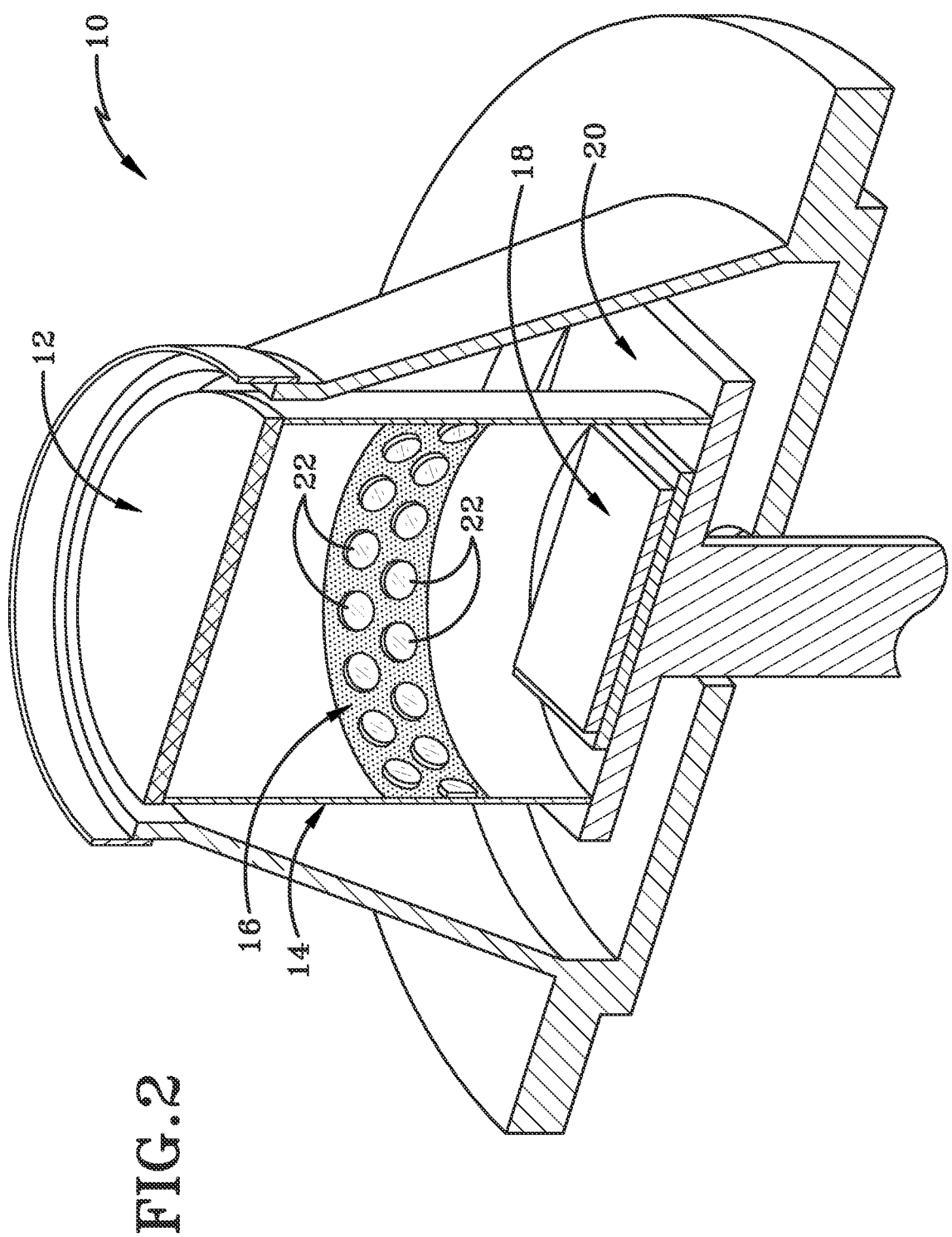
FIG. 2 is a side elevation cross sectional view of an infrared camera according to one aspect of the present disclosure.

With reference to FIGS. 1 and 2, a central portion of a basic infrared camera is shown and generally indicated at reference 10. As used herein, references to infrared (IR) camera 10 will be understood to include any additional camera components, electronics, optics, and/or external packaging, which have been removed from the figures herein for clarity and simplicity in the disclosure. As illustrated in FIG. 1, IR camera 10 is contemplated to be a cryogenically-cooled IR camera 10; however, the disclosure provided herein may be readily adapted for use with uncooled systems and/or systems utilizing other types of cooling mechanisms, as discussed further below. Further, as used herein, references to IR camera 10 or camera 10 will be understood to include both cooled and uncooled systems, unless specifically stated otherwise. Similarly, references to IR camera 10 or camera 10 will be further understood to include any additional and necessary components for normal operation, unless specifically stated otherwise.

Accordingly, the central portion of IR camera 10 may include a filter 12, a shield 14 having a shield insert 16, a focal plane array (FPA) 18 and a cold finger 20.

IR camera 10 may be a short-wave infrared (SWIR), mid-wave infrared (MWIR), or a long-wave infrared (LWIR) detector, or may be any other suitable IR camera or detector including those IR cameras operable to detect intermediate IR wavelengths and/or wavelengths that fall into one or more the SWIR, MWIR, and/or LWIR windows. As mentioned above, camera 10 may include any other suitable, desired, and/or necessary components for normal operation thereof, including, but not limited to, additional electronics, optical components, and/or external packaging. Similarly, for other embodiments, components described herein may be modified or omitted as dictated by the desired implementation.

Filter 12 may be one or more suitable optical filters which may be operable to block or otherwise filter undesired wavelengths from entering and reaching the focal plane array 18. According to one aspect, filter 12 may be a cold filter which may be operable to block visible light from passing therethrough while still permitting infrared wavelengths to penetrate the filter. According to another aspect, filter 12 may be or include a plurality of filters as dictated by the desired implementation. Filter(s) 12 may be, or may be adapted from, any suitable and commercially available filter as desired. As used herein, the terms filter and cold filter are understood to refer to filter 12 and may include any suitable filter or filter type, unless specifically stated otherwise.

Shield 14 may be a cold shield or the like and may be configured and adapted to enclose the focal plane array 18 and components thereof within shield 14. According to one aspect, shield 14 may be a cylindrical cold shield which may be in contact with cold finger 20, as discussed below, and may be maintained at a constant temperature in embodiments utilizing cooled cameras 10 and may be any suitable and/or commercially available cold shield, as dictated by the desired implementation. Shield 14 may be operable to block or shield FPA 18 from any or all wavelengths of the electromagnetic spectrum, including visible light and/or IR wavelengths so that the FPA 18 only encounters the IR wavelengths passing through cold filter 12.

Shield 14 may be constructed of any suitable material including metal, plastic/polymer, or the like provided the selected material provides the necessary operable benefits, as discussed herein.

Shield insert 16 may be a panel that occupies at least a portion of the shield 14 and may be an electronic material which may accept a current to modify the physical and/or perceived temperature of shield insert 16, as discussed herein. Specifically, shield insert 16 may be any suitable infrared material and may include one or more light emitting diodes 22 (LEDs—referred to herein as diodes 22) that emit different types of infrared light. Insert 16 may cover at least a portion of an interior surface of the cold shield 14 and may wrap 360° around the focal plane array (FPA) 18, as discussed below.

Diodes 22 may provide one or both of positive and negative luminescence in that they may be operable to emit IR light (positive luminescence) and/or absorb more light (negative luminescence) than the diode 22 may normally emit/absorb at a resting state. Diodes 22 may therefore be operated under reverse bias with negative luminescence or a negative luminescent mode wherein the apparent temperature of the shield insert 16 is reduced and in a forward bias positive or electroluminescent mode wherein the apparent temperature of the shield insert 16 is increased. This may provide camera 10 the ability to perform one-point, offset, and continuous non-uniformity correction (NUC), as discussed further below.

According to one aspect, the diodes 22 may be a plurality of discreet elements which may be networked as to be simultaneously biased to the positive or electroluminescent and/or negative luminescent modes. According to another aspect diodes 22 may be etched on a separate material layer 24 which may be bonded to the cold shield 14, with the entirety of the diode 22 etched material layer 24 biased to the positive or negative luminescent modes. According to one aspect, up to 50 percent of the material layer 24 may be etched and considered active diode 22 area. According to another aspect, diodes 22 may be discreet cylindrical elements consisting of a p-n junction of semiconductor material having bandgap energy ranging from 0.062 to 0.285 eV. The bandgap of the diodes 22 should be greater than or equal to the bandgap of the FPA 18, and it must be less than or equal to the cut-on energy of the IR camera 10.

Accordingly, diodes 22 may be any suitable diode 22 and/or IR LED type, including, but not limited to, one or more of lead selenide (PbSe), an alloy selected from the $Pb_{1-x}Sn_xSe$ group, an alloy selected from the $Hg_{1-x}Cd_xTe$ group, and/or indium antimonide (InSb). According to another aspect, diodes 22 may be an nBn configuration based on III-V compound semi-docturous materials. According to yet another aspect, diodes 22 may be a strained layer superlattice (SLS) semiconductor comprising a P-N junction or an nBn device.

The exact location of insert 16 and diodes 22 within shield 14 may vary depending on the specific parameters and desired effects of the shield insert 16 and diodes 22 on the FPA 18. For example, the location of shield insert 16 may be chosen to minimize specular reflection impact (assuming QE<1). It is contemplated that shield insert 16 may wrap around the entire internal circumference of shield 14 as to fully surround the FPA 18, as discussed further herein.

Focal plane array (FPA) 18 may be a standard FPA 18 having a plurality of individual pixels which may be arranged in a specific pattern, as desired. The number, size, arrangement, and/or pattern of pixels on FPA may vary dependent upon the desired implementation and specific installation parameters. For example, in a larger IR camera 10, such as those used in telescopes or observatories, a larger FPA 18 may be utilized having a greater number of pixels. Similarly, the inverse is also true, i.e. smaller IR cameras 10 may utilize smaller FPA 18 and having a fewer number of pixels thereon. As camera 10 is to be understood as a typical or standard IR camera, the placement of FPA therein may be such that IR light waves terminate at or on the FPA for the most efficient detection thereof and may further include any suitable optics or optical components operable to accomplish that goal.

As it will be understood further herein, FPA 18 may be operationally connected to one or more computers or processors including one or more non-transitory storage mediums and/or one or more microprocessors or logics capable of carrying out and executing a set of instructions or processes encoded thereon, as further discussed herein. According to one aspect, FPA 18 may be operationally connected to a computer or processor that is carried on, with, or as part of IR camera 10. According to another aspect, a computer or processor may be remote from IR camera 10 such that FPA 18 and/or IR camera 10 may be in wired or wireless communication therewith. The connectivity and communication between FPA 18 and/or IR camera 10 within an associated computer or processor may therefore vary, depending upon the desired implementation and installation parameters of IR camera 10.

Cold finger 20 may be any suitable cooling device and may utilize any suitable coolant including, but not limited to, Dewar cold fingers, cryo-pumps, or the like, and may further utilize any suitable coolant, including liquid nitrogen, helium, or similar coolants. According to one aspect, cold finger 20 may be any suitable and commercially available cooling apparatus as commonly used with infrared devices such as IR camera 10. As understood herein, for embodiments utilizing cold finger 20, IR cameras 10 are considered cooled cameras and each of the central portion components of IR camera 10 may be cooled and maintained at a reduced temperature relative to external components and the external environment in which IR camera 10 is being operated. The specific temperature to which these components may be cooled may vary depending on the installation parameters, the specific implementation, and/or desired operational aspects and objectives of IR camera 10.

According to one aspect, the present disclosure may be directed to IR cameras 10 that are uncooled which may omit or otherwise optionally disable cold finger 20 as desired and/or dictated by the desired implementation. Further according to this aspect, the shield 14 may be a portion of the camera 10 packaging surrounding the FPA 18.

Diodes 22, as discussed above as being one or more IR LEDs, may be LEDs capable of emitting light in one or more infrared wavelengths. According to the desired implementation, the primary determining factor of what type of LED (i.e. what range of wavelength of IR light the LED emits) may be determined by the specific type of diode 22 and/or FPA 18 being used. Put another way, the selected diode 22 type should be compatible with FPA 18 such that FPA 18 is readily and easily capable of detecting the wavelengths emitted from diodes 22. As shield insert 16 is contemplated to surround FPA 18, the diode 22 may be set apart from the optical path, i.e. the path IR light takes through the cold filter 12 and to the FPA 18, to introduce IR light into the optical path at an angle thereto. According to one aspect, the angle may be determined according to the specific implementation parameters but may be less than 90 degrees from the optical path as to prevent side reflection or other similar effects.

All IR cameras, including IR camera 10, tend to suffer from non-uniformity of the pixels on the FPA. Non-uniformity is essentially a measure of variation across neighboring pixels within the FPA of the camera and may be introduced during the power on and/or power up cycles of the IR cameras (typically referred to as offsets) and/or by noise and/or drift during operation, for example drift caused by temperature fluctuations of individual components due to heat generated by the camera's own components that may interfere with temperature readings during operation.

The offset, noise, and/or drift may then manifest as deteriorations in image quality. According to one non-limiting example, if two adjacent pixels (numbered 1 and 2 for purposes of this example) are pointed at an identical source, these pixels should have an identical or nearly identical output. However, if one pixel, for example pixel 1, suffers from an offset at the power on cycle, it may give a different reading than pixel 2. Similarly, if pixel 1 is closer in proximity to a component that is shifting in temperature over time, pixel 1 may change temperature more rapidly than pixel 2, thus giving different readings between the adjacent pixels.

Accordingly, for all types of non-uniformity, correction (i.e. NUC) can be performed within the camera to improve accuracy of the images displayed or produced. NUC, at its most basic, is a process of measuring the IR radiation originating from within the camera and the camera components and subtracting those from the images of the target subject. NUC adjusts gain and offset at each pixel within the FPA producing a higher quality and more accurate image. NUC, as discussed previously herein, is typically performed utilizing a mechanical shutter or gimbal to cut off the camera's view of the target subject which freezes the image stream. The shutter or gimbal then acts as a flat reference source allowing the camera to calibrate itself and to thermally stabilize. This process is also referred to as a flat field correction (FFC) and is not desirable as it interrupts the camera's view resulting in a loss of scene acquisition and further increases the size, weight, and cost of the camera by including additional components requiring additional space and architecture to support and operate. Particularly in surveillance-based applications, the loss of scene acquisition during these NUC updates may cause additional issues in that the camera may miss or otherwise not capture an image at a critical moment.

Having thus described the structure and central components of IR camera 10, a method of operation and use will now be discussed.

Figure 3:
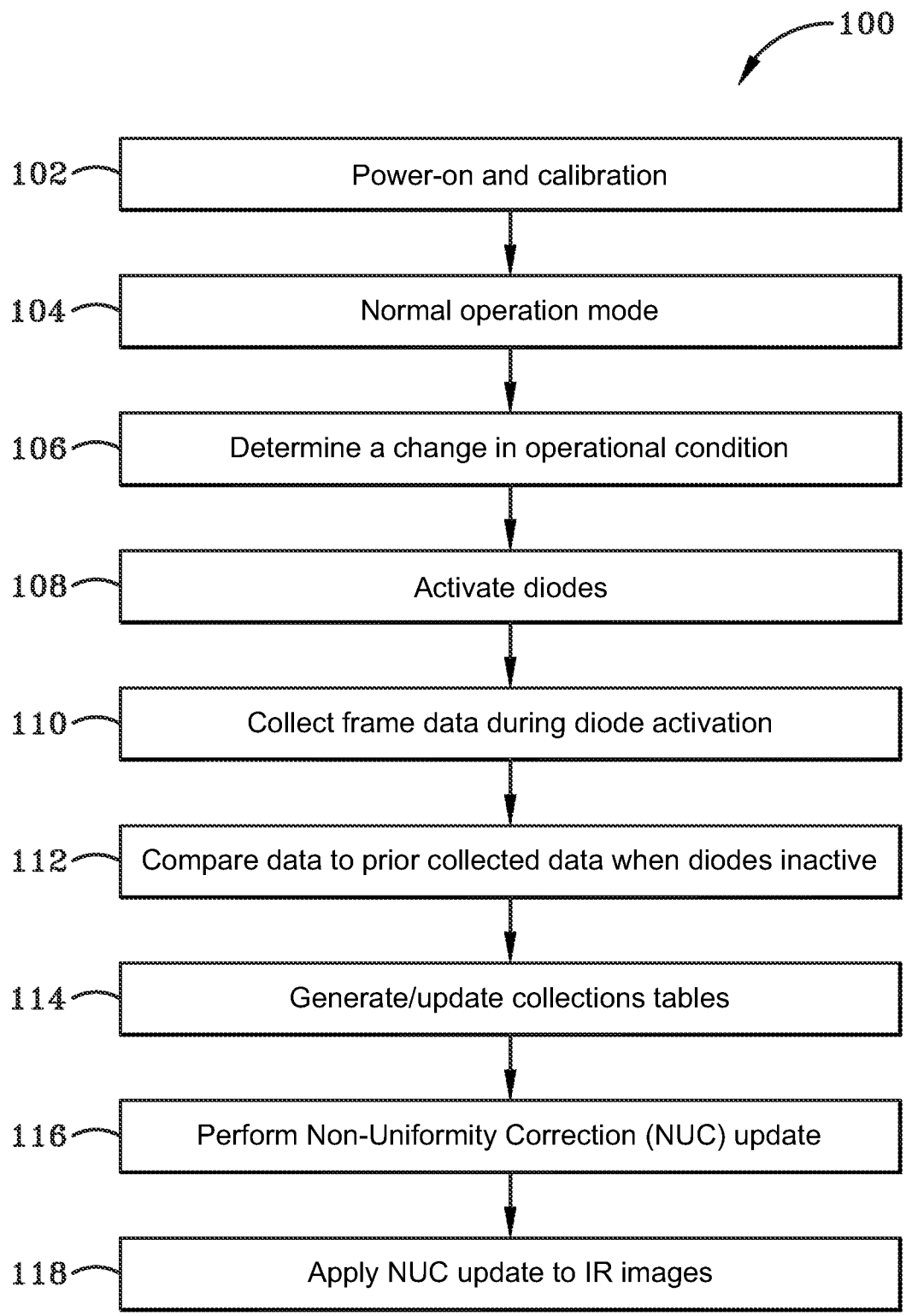
FIG. 3 is an exemplary flow chart depicting an exemplary operation of a luminescent cold shield panel for an infrared camera according to one aspect of the present disclosure.

With reference to FIGS. 1-3, an IR camera 10 of the present disclosure may be operated and used according to normal and understood processes. For example, IR camera 10 may be placed in an area of interest and/or pointed at a target of interest and powered on normally. However, during operation, the exclusion of a shutter or gimbal may be overcome, as discussed below, by operation and use of insert 16 and diodes 22.

Therefore, when IR camera 10 is operated in what is considered a normal operation mode, IR light may enter the camera through camera optics and may travel through the filter 12 and to the FPA 18 where it may be detected and data collected therefrom may be transferred to a processor or the like before an image is generated from the detected IR light. The path of IR light from the target through the IR camera 10 and filter 12 to FPA 18 may be hereinafter referred to generally as the optical path and may include any necessary or desired additional components including optics or the like contained therein. For example, optical lenses and/or optical mirrors may be present within the optical path to focus and/or direct the entering IR light as desired.

When IR camera 10 is being powered on for use in the normal operation mode, the camera 10 and/or FPA 18 may be initially calibrated through use of diodes 22 on shield insert 16. Specifically, this initial calibration may take place by directing diodes 22 to emit IR light, thus washing out any environmental IR light passing through the filter 12 and to the FPA 18. This washout effect may provide a uniform surface for initial calibration of FPA 18. Once initially calibrated, IR camera 10 may then enter the normal operation mode wherein IR light from the environment may be detected with particular emphasis placed on the IR light generated by the target.

Then, during normal operation, both drift and noise may arise as various components of IR camera 10, generate heat and/or environmental temperature or component temperatures fluctuate. As discussed previously herein, this can cause non-uniformity in any images produced therefrom which is then displayed as errors and/or unclear imaging to the user. Rather than blocking or otherwise obscuring scene acquisition utilizing a shutter or gimbal or the like, IR camera 10 may employ shield insert 16 and diodes 22 to adjust the perceived IR profile of the internal camera components to maintain a consistent level that may be measured and subtracted from and/or added to the resulting image, as necessary, depending upon the specific type NUC being performed. Put another way, the shield insert 16 and diodes 22 may be controlled such that, from the perspective of the FPA 18, the internal environment of IR camera 10 maintains a constant IR wavelength profile which is then interpreted as a constant background measurement which may be then used for calibration and generation of a corrections table.

In particular, IR camera 10 (by way of one or more processors) may generate a corrections table that may be calculated based on subtracting the scene data between consecutive frames wherein one frame (e.g. the first frame) includes a luminescent effect from illuminating diodes 22 and the second or next frame the luminescent effect is turned off. Thus, the NUC process may occur on a frame by frame, i.e. continuous and ongoing, basis. As operation of camera 10 continues, a plurality of these on off frame sets may be used to continue to re-calculate and populate the corrections table, which may then be applied to all subsequent images and may be fine-tuned as more data is collected via these on/off frame sets. This may further allow the NUC updates to be applied with multiple set points, thus enabling corrections to both detector offset tables and detector gain tables, again, without the need to block scene acquisition during operation. Further, detector gain tables may be updated with multiple set points as a higher order polynomial fit to correct for non-linear gain. Accordingly, the operation of diodes 22 and insert 16 may allow for continuous camera 10 operation and scene detection while simultaneously providing continuous NUC.

This solution may be applied for both cooled and uncooled cameras in that the inclusion of shield insert 16 and diodes 22, and the use thereof, may be automatically controlled by processor to product the luminescent effects as desired and dictated by the specific implementation. Put another way, the processor associated with IR camera 10 may automatically adjust the level and type of luminescent effect (i.e. negative and/or positive luminescence), as needed, to provide the proper luminescent effect based on detected environmental requirements.

According to one non-limiting example, While IR camera 10 is operating in a normal operations mode, the associated processor may detect a change in the imaging that requires an NUC update. Then, processor may automatically activate the diodes 22 of shield insert 16 to provide a luminescent effect appropriate to the detected change. For purposes of this example, the processor may automatically activate the diodes to emit IR light (positive luminescence). Once the diodes are activated, they may radiate IR light that may be interpreted as a constant IR profile within camera and they may remain activated for any suitable amount of time (e.g. the activation period), for example, one frame of the imaging period. Then, diodes 22 may be deactivated, and the data from the activation period may be compared to an equal amount of the imaging period wherein the diodes 22 were not activated, for example, one frame of the imaging period. These data may be compared to allow for NUC and image correction, providing a highly accurate and repeatable image. This process may be repeated on a continuous basis throughout normal operation of the IR camera 10. Alternatively, this process may be repeated on a predetermined schedule or at any suitable or desired interval during operation of IR camera 10.

As diodes 22 are only activated to emit (or absorb) a sufficient amount of IR light as to generate a uniform internal IR profile within the camera 10, the diodes 22 and any light coming from (or being absorbed thereby) may be in such small quantity as to not obscure or interfere with scene acquisition, allowing for continuous operation of camera 10 while simultaneously providing NUC update capability during operation.

With reference now to FIG. 3, a flow chart generally illustrating the above process is shown and will now be described. As shown, the general process is indicated as reference 100.

Process 100 may be considered to start when the IR camera 10 is powered on, beginning with initial calibration. The initial power on cycle and calibration is indicated as step 102. Once power on and calibration are complete, the camera 10 may enter a normal operation mode, indicated at reference 104. During operation, then, the camera 10, or more particularly, the processor, may determine that an operational condition (e.g. temperature, noise, etc.) has changed. This determination is made in step 106, which may then prompt an activation of diodes 22 in step 108.

Depending upon the specific condition and the nature of the change, diodes 22 may be activated in step 108 to a positive luminescence mode wherein the diodes 22 emit IR light or to a negative luminescence mode wherein the diodes 22 absorb IR light to produce an IR profile within camera 10 that is essentially neutral. Once diodes 22 have been activated, data may be collected in step 110 and compared (in step 112) to data collected when diodes 22 are not active, which may for the basis for generating a corrections table (or updating the table if previously generated). The generation of and/or update to the corrections table is indicated as step 114. The corrections table may include multiple set points to enable corrections to both detector offset and detector gain tables. Further, gain tables generated in this step may be likewise updated with multiple set points as a higher order polynomial fit to correct for non-linear gain.

From these corrections tables, the processor may perform an NUC update by subtracting the data from the period during which the diodes 22 were active from the data collected while the diodes 22 were inactive and applying the results to a resulting image. The NUC update is indicated as step 116 while the application of the NUC update to the resulting image is indicated as step 118.

As discussed above, steps 108-118 may occur upon detection of a condition change, or may alternatively occur at pre-set intervals or may occur on a continuous basis. According to another aspect, steps 108-118 may be prompted by a third-party system, user, operator, or the like. According to another aspect, process 100 may be utilized on an as needed basis, or as part of a larger process where desired.

Additionally, steps in process 100 may be performed simultaneously with other steps in process 100, or in a different order than presented above where appropriate.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An infrared (IR) detector comprising:
a focal plane array (FPA) operable to detect IR light;
a shield surrounding the FPA; and
a plurality of luminescent diodes etched into a material layer integrated into the shield surrounding the FPA to define a luminescent material;
wherein the IR detector is free from any opto-mechanical non-uniformity correction (NUC) devices.

2. The IR detector of claim 1 further comprising:
a cold finger operable to cryogenically reduce an operational temperature of the detector, wherein the shield surrounding the FPA is a cold shield.

3. The IR detector of claim 1 wherein the detector is an IR camera.

4. The IR detector of claim 3 wherein the IR camera further comprises:
one of a short-wave infrared, a mid-wave infrared, and long-wave infrared camera.

5. The IR detector of claim 1 wherein the material layer forms a continuous strip of material covering the entire shield surrounding the FPA.

6. The IR detector of claim 1 wherein the luminescent material is one of PbSe, an alloy from the $Pb_{1-x}Sn_xSe$ group, an alloy from the $Hg_{1-x}Cd_xTe$ group, and InSb.

7. The IR detector of claim 1 wherein the luminescent material is an nBn configuration based on III-V compound semiconductors instead of a p-n junction.

8. The IR detector of claim 1 wherein the luminescent material is a strained-layer superlattice semiconductor comprising one of a p-n junction and an nBn device.

9. The IR detector of claim 1 wherein the plurality of luminescent diodes further comprise:
discrete elements in a networked configuration that are further operable to be biased to at least one of a negative luminescent mode wherein an apparent temperature of the luminescent material is reduced and an electroluminescent mode wherein an apparent temperature of the luminescent material is increased.

10. The IR detector of claim 9 wherein the plurality of luminescent diodes are operable under reverse bias in the negative luminescent mode.

11. The IR detector of claim 9 wherein the plurality of luminescent diodes are operable under forward bias in the electroluminescent mode.

12. The IR detector of claim 9 wherein the plurality of luminescent diodes further comprise:
discrete cylindrical elements consisting of a p-n junction of semiconductor material having a bandgap energy ranging from 0.062 to 0.285 eV.

13. The IR detector of claim 12 wherein a bandgap energy of the luminescent material is greater than or equal to a bandgap of the FPA, and is less than or equal to a cut-on energy of the detector.

14. A method of performing non-uniformity correction (NUC) updates on an infrared (IR) detector comprising:
integrating a plurality of luminescent diodes, etched into a material layer, into a shield surrounding a focal plane array (FPA) of the IR detector to define a luminescent material;
calculating a corrections table based on subtracting scene data between consecutive image frames for which a luminescent effect of the plurality of luminescent diodes is activated for one frame and inactive for a subsequent frame;

applying the corrections table with multiple set points to provide corrections to detector offset and detector gain; and applying the NUC update results to an IR image.

15. The method of claim 14 wherein calculating a corrections table further comprises calculating the corrections table using plurality of sets consecutive image frames for which a luminescent effect of the plurality of luminescent diodes is activated for one frame and inactive for a subsequent frame.

16. The method of claim 15 wherein calculating a corrections table further comprises:

calculating detector offset and detector gain tables.

17. The method of claim 16 further comprising:

updating detector gain tables with multiple set points as a higher order polynomial fit to correct for non-linear gain.

18. The method of claim 14 further comprising:

operating the plurality of luminescent diodes in a negative luminescent mode wherein an apparent temperature of the plurality of luminescent diodes is reduced.

19. The method of claim 14 further comprising:

operating the plurality of luminescent diodes in an electroluminescent mode wherein an apparent temperature of the plurality of luminescent diodes is increased.

* * * * *